United States Patent
Joukawa et al.

(10) Patent No.: US 6,710,332 B2
(45) Date of Patent: Mar. 23, 2004

(54) SYSTEM FOR DETECTING ROTATION ANGLES OF AN DIFFRACTING PORTION USING A ABSORPTION CELL SEALED WITH A PLURALITY OF KINDS OF GASES AND LINEAR INTERPOLATION

(75) Inventors: Hideya Joukawa, Yamato (JP); Tatsuki Kakimoto, Hiratsuka (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 10/131,516

(22) Filed: Apr. 23, 2002

(65) Prior Publication Data

US 2002/0162954 A1 Nov. 7, 2002

(30) Foreign Application Priority Data

Apr. 25, 2001 (JP) .......................................... 2001-127317

(51) Int. Cl.⁷ .................................................. H01J 3/14
(52) U.S. Cl. .................. 250/237 G; 250/226; 250/573; 356/328; 356/334
(58) Field of Search ............................... 250/216, 226, 250/231.13, 231.14, 237 G, 237 R, 227.21, 227.23; 356/243.1, 300, 305, 326, 328, 334, 432, 437, 320, 323, 330; 370/102

(56) References Cited

U.S. PATENT DOCUMENTS

| | | | |
|---|---|---|---|
| 5,828,061 A | * 10/1998 | Kakimoto | 250/237 G |
| 6,249,343 B1 | * 6/2001 | Wang et al. | 356/243.1 |
| 6,441,900 B1 | * 8/2002 | Fujiyoshi | 356/300 |
| 6,452,674 B1 | * 9/2002 | Fujiyoshi | 356/328 |

* cited by examiner

Primary Examiner—David Porta
Assistant Examiner—Patrick J. Lee
(74) Attorney, Agent, or Firm—Frishauf, Holtz, Goodman & Chick, P.C.

(57) ABSTRACT

A diffracting portion is composed of optical elements including an optical element, and diffracts light. A drive unit rotates the optical element. An angle detector detects a rotation angle of the optical element. A reference wavelength light source includes a light source and an absorption cell sealed with a plurality of gasses of different kinds having mutually different absorption line wavelengths, and emits the reference light of a specific wavelength depended on the absorption cell toward the diffracting portion. A reference photodetector converts a diffracted light from the diffracting portion into an electric signal. A signal processor receives a rotation angle issued by the angle detector when detecting a predetermined value of the electric signal, and determines the predetermined rotation angle corresponding to the specific wavelength determined depending on the plurality of gases.

24 Claims, 6 Drawing Sheets

SYSTEM FOR DETECTING ROTATION ANGLES OF AN DIFFRACTING PORTION USING A ABSORPTION CELL SEALED WITH A PLURALITY OF KINDS OF GASES AND LINEAR INTERPOLATION

CROSS-REFERENCE TO RELATED APPLICATIONS

This application is based upon claims the benefit of priority from the prior Japanese Patent Application No. 2001-127317, filed Apr. 25, 2001, the entire contents of which are incorporated herein by reference.

BACKGROUND OF THE INVENTION

1. Field of the Invention

The present invention relates to a system for detecting rotation angles of a diffracting portion, and more particularly to a system including an apparatus and method for detecting rotation angles of a diffracting portion using an absorption cell sealed with a plurality of gases of different kinds having mutually different absorption line wavelengths, as the technology for achieving a correct correspondence of relation between the angle of an optical element of the diffracting portion to be detected in the apparatus for detecting rotation angles of a diffracting portion used in an optical appliance, and the wavelength of the light to be diffracted in a predetermined direction by the diffracting portion.

2. Description of the Related Art

Hitherto, in optical appliances such as an optical spectrum analyzer and a tunable wavelength light source, a diffracting portion composed of an optical element including a diffraction grating is used in order to detect the light to be measured or light of desired wavelength from light of wide band.

The diffraction grating is an element for diffracting the incident light in a direction depending on its wavelength by means of multiple grooves disposed parallel at predetermined intervals on its surface.

In the optical appliances such as an optical spectrum analyzer and a tunable wavelength light source, it is designed to vary the wavelength of the light diffracted in a desired direction, by varying the angle of the diffraction grating of the diffracting portion according to the incident light, or varying the angle of a reflector for reflecting the diffracted light from the diffraction grating to the diffraction grating with respect to the diffraction grating.

Therefore, an optical appliance having such a diffracting portion comprises a driving device for rotating the diffraction grating or reflector, and an angle detector for detecting its angle, and the corresponding relation between the angle detected by the angle detector and the wavelength of the light diffracted in a predetermined direction (hereinafter called angle-wavelength relation) is stored preliminarily.

In such optical appliances, for example, when a specific wavelength is designated, the diffraction grating or reflector for composing the diffracting portion is set at an angle corresponding to the designated wavelength so that the light of the designated wavelength may be diffracted in a predetermined direction, or the wavelength of the light diffracted in a predetermined direction is determined from the angle detected by the angle detector.

In this case, however, the characteristic of the optical system including the diffracting portion changes slightly according to environmental conditions, such as ambient temperature, humidity or atmospheric pressure, and this characteristic varies the angle-wavelength relation.

To solve this problem, the present applicants etc. disclosed an apparatus for detecting rotation angles of a diffracting portion intended to determine the angle-wavelength relation by using an absorption cell extremely small in change in wavelength due to changes in environmental conditions in U.S. Pat. No. 5,828,061.

The absorption cell used in this apparatus for detecting rotation angles of a diffracting portion is sealed with a single specific gas, and it absorbs the light of a wavelength (absorption line wavelength) determined by this gas from the incident light, and emits the light of the absorption wavelength.

This absorption line wavelength is a known value determined by the kind of the single gas sealed inside, and is hardly changed by changes in environmental conditions such as ambient temperature, humidity or atmospheric pressure, and the precision of the absorption line wavelength is extremely high.

Accordingly, this apparatus for detecting rotation angles of a diffracting portion is capable of determining accurately the angle-wavelength relation of the diffraction grating in the present environments by determining the angle detected by the angle detector when the diffraction grating diffracts the light of this absorption line wavelength in a predetermined direction.

In this case, the absorption lines of the specific single gas sealed in the absorption cell are concentrated in a relatively narrow wavelength region.

Accordingly, this apparatus for detecting rotation angles of a diffracting portion can accurately determine the angle-wavelength relation near the wavelength region, but cannot accurately determine the angle-wavelength relation in a wavelength region far apart from this wavelength region.

Therefore, in optical appliances required to vary the wavelength of measuring light or output light in a wide range such as the optical spectrum analyzer or the tunable wavelength light source, high wavelength precision cannot be maintained in a full wide range.

To solve this problem, simply, it may be considered to determine each specific rotation angle by selectively changing over a plurality of absorption cells sealed with a single gas of different kinds, but in such a configuration the rotation angle between specific rotation angles cannot be determined, and the structure of the entire apparatus becomes complicated.

BRIEF SUMMARY OF THE INVENTION

It is hence an object of the invention to solve these problems and present an apparatus and method for detecting rotation angles of a diffracting portion capable of accurately determining the angle-wavelength relation in a wide wavelength region in a simple configuration.

In order to achieve the above-described object, according to a first aspect of the present invention, there is provided an apparatus for detecting rotation angles of a diffracting portion comprising:

a diffracting portion which is composed of optical elements including a predetermined optical element and diffracts light;

a drive unit which rotates the predetermined optical element of the diffracting portion;

an angle detector which detects the rotation angle of the predetermined optical element;

a reference wavelength light source which includes a light source and an absorption cell and emits the reference light of a specific wavelength determined depending on the absorption cell toward the diffracting portion;

a reference photodetector which receives a diffracted light emitted in a predetermined direction from the diffracting portion receiving the reference light from the reference wavelength light source, and converts the diffracted light into an electric signal; and a signal processor which receives a rotation angle to be issued by the angle detector when detecting a predetermined value of the electric signal from the reference photodetector by rotating the predetermined optical element by the drive unit, and determines the predetermined rotation angle corresponding to the specific wavelength, wherein the absorption cell is sealed with a plurality of gases of different kinds having mutually different in the wavelength region in which absorption lines exist, and the signal processor is designed to determine plural specific rotation angles corresponding to the specific wavelength determined depending on the plurality of gases of different kinds sealed in the absorption cell, and also determine the rotation angle between plural specific rotation angles by predetermined complementary calculation including linear complement.

In order to achieve the above-described object, according to a second aspect of the present invention, there is provided the apparatus for detecting rotation angles of a diffracting portion according to the first aspect, wherein the plurality of gases of different kinds sealed in the absorption cell are at least two gases selected from carbon dioxide ($CO_2$) of which absorption line wavelengths are concentrated around 1.43 $\mu$m, acetylene gas ($C_2H_2$) of which absorption line wavelengths are concentrated around 1.53 $\mu$m, and methane gas ($CH_4$) of which absorption line wavelengths are concentrated around 1.65 $\mu$m.

In order to achieve the above-described object, according to a third aspect of the present invention, there is provided the apparatus for detecting rotation angles of a diffracting portion according to the first aspect, wherein the plurality of gases of different kinds sealed in the absorption cell are a first gas such as acetylene gas ($C_2H_2$) of which absorption line wavelengths are concentrated around 1.53 $\mu$m and a second gas such as methane gas ($CH_4$) of which absorption line wavelengths are concentrated around 1.65 $\mu$m, and the signal processor determines first and second specific rotation angles corresponding to first and second specific wavelengths determined depending on the first and second gases sealed in the absorption cell, and determines the rotation angle between plural specific rotation angles by predetermined complementary calculation including linear complement, and therefore the apparatus for detecting rotation angles of a diffracting portion is designed to cover the wavelength region of the light in part of S band (1.46 $\mu$m to 1.53 $\mu$m) and C band (1.53 $\mu$m to 1.565 $\mu$m) on the basis of the specific wavelength determined depending on the first gas, and L band (1.565 $\mu$m to 1.625 $\mu$m) on the basis of the specific wavelength determined depending on the second gas.

In order to achieve the above-described object, according to a fourth aspect of the present invention, there is provided the apparatus for detecting rotation angles of a diffracting portion according to the first aspect, wherein the light emitted from the absorption cell in the reference wavelength light source has a plurality of absorption lines in each wavelength region, and the signal processor calculates the rotation angle determining whether or not the light received by the reference photodetector corresponds to the absorption line of which wavelength from the level change of the diffracted light issued from the diffracting portion, by making use of the characteristic that the plural absorption lines of each wavelength region have mutually different absorption rates in each absorption line.

In order to achieve the above-described object, according to a fifth aspect of the present invention, there is provided the apparatus for detecting rotation angles of a diffracting portion according to the fifth aspect, further comprising:

a rotation angle setting unit which has angle-wavelength data and issues to the drive unit angle data for driving so that the predetermined optical element of the diffracting portion may be set at a rotation angle corresponding to the wavelength value, and a data correcting unit which corrects the angle-wavelength data possessed in the rotation angle setting unit based on the plural specific rotation angles corresponding to the plural specific wavelengths in each wavelength region.

In order to achieve the above-described object, according to a sixth aspect of the present invention, there is provided the apparatus for detecting rotation angles of a diffracting portion according to the first aspect, wherein the apparatus for detecting rotation angles of a diffracting portion is used for analyzing the spectrum of the light to be measured, and the signal processor has a feeding unit which feeds correction data from the data correcting means to the drive unit in order to correct the angle of the predetermined optical element of the diffracting portion prior to spectrum analysis of the light to be measured.

In order to achieve the above-described object, according to a seventh aspect of the present invention, there is provided the apparatus for detecting rotation angles of a diffracting portion according to the sixth aspect, further comprising:

a measuring photodetector which receives the diffracted light of the light to be measured while the predetermined optical element of the diffracting portion is rotating according to the set wavelength value, and converts the diffracted light into an electric signal, and a spectrum processor which issues the electric signal issued from the measuring photodetector by relating to the set wavelength value.

In order to achieve the above-described object, according to an eighth aspect of the present invention, there is provided the apparatus for detecting rotation angles of a diffracting portion according to the sixth aspect, further comprising:

a measuring photodetector which receives the diffracted light of the light to be measured while the predetermined optical element of the diffracting portion is rotating according to the set wavelength value, and converts the diffracted light into an electric signal, and a spectrum processor which determines an electric signal at the set wavelength value based on the angle-wavelength data corrected by the data correcting unit, from the electric signal issued by the measuring photodetector, and issues by relating the set wavelength value with the electric signal.

In order to achieve the above-described object, according to a ninth aspect of the present invention, there is provided the apparatus for detecting rotation angles of a diffracting portion according to the eighth aspect, further comprising a changing unit which changes over between the reference light from the reference wavelength light source and the light to be measured.

In order to achieve the above-described object, according to a tenth aspect of the present invention, there is provided the apparatus for detecting rotation angles of a diffracting portion according to the eighth aspect, wherein the reference photodetector and measuring photodetector are realized by one common unit.

In order to achieve the above-described object, according to an eleventh aspect of the present invention, there is provided the apparatus for detecting rotation angles of a diffracting portion according to the fourth, wherein the apparatus for detecting rotation angles of a diffracting portion is used in a tunable wavelength light source of external resonance type for reflecting the light between the diffracting portion and the light source, and issuing the resonating variable wavelength light, and the signal processor includes a feeding unit which feeds correction data from the data correcting means to the drive unit in order to correct the rotation angle of the predetermined optical element of the diffracting portion prior to outputting the tunable wavelength light from the tunable wavelength light source of external resonance type.

In order to achieve the above-described object, according to a twelfth aspect of the present invention, there is provided the apparatus for detecting rotation angles of a diffracting portion according to the eleventh aspect, further comprising a changing unit which changes over between the reference wavelength light source and the main light source.

In order to achieve the above-described object, according to a thirteenth aspect of the present invention, there is provided a method of detecting rotation angles of a diffracting portion comprising:

emitting a reference light of a specific wavelength determined depending on an absorption cell from a reference wavelength light source including a light source and the absorption cell;

diffracting the reference light emitted from the reference wavelength light source, by a diffracting portion composed of optical elements including a predetermined optical element;

rotating the predetermined optical element of the diffracting portion by a drive unit;

detecting the rotation angle of the predetermined optical element by an angle detector;

receiving a diffracted light emitted in a predetermined direction from the diffracting portion receiving the reference light from the reference wavelength light source, and converting the diffracted light into an electric signal by a reference photodetector; and receiving a rotation angle issued by the angle detector when detecting a predetermined value of electric signal from the reference photodetector by rotating the predetermined optical element by the drive unit, and determining the predetermined rotation angle corresponding to the specific wavelength by a signal processor, wherein the absorption cell is sealed with a plurality of gases of different kinds having mutually different in the wavelength region in which absorption lines exist, and the signal processor determines plural specific rotation angles corresponding to the specific wavelength determined depending on the plurality of gases of different kinds sealed in the absorption cell, and also determines the rotation angle between plural specific rotation angles by predetermined complementary calculation including linear complement.

In order to achieve the above-described object, according to a fourteenth aspect of the present invention, there is provided the method of detecting rotation angles of a diffracting portion according to the thirteenth aspect, wherein the plurality of gases of different kinds sealed in the absorption cell are at least two gases selected from carbon dioxide ($CO_2$) of which absorption line wavelengths are concentrated around 1.43 $\mu$m, acetylene gas ($C_2H_2$) of which absorption line wavelengths are concentrated around 1.53 $\mu$m, and methane gas ($CH_4$) of which absorption line wavelengths are concentrated around 1.65 $\mu$m.

In order to achieve the above-described object, according to a fifteenth aspect of the present invention, there is provided the method of detecting rotation angles of a diffracting portion according to the thirteenth aspect, wherein the plurality of gases of different kinds sealed in the absorption cell are a first gas such as acetylene gas ($C_2H_2$) of which absorption line wavelengths are concentrated around 1.53 $\mu$m and a second gas such as methane gas ($CH_4$) of which absorption line wavelengths are concentrated around 1.65 $\mu$m, and the signal processor determines first and second specific rotation angles corresponding to first and second specific wavelengths determined depending on the first and second gases sealed in the absorption cell, and determines the rotation angle between plural specific rotation angles by predetermined complementary calculation including linear complement, and therefore the apparatus for detecting rotation angles of a diffracting portion is designed to cover the wavelength region of the light in part of S band (1.46 $\mu$m to 1.53 $\mu$m) and C band (1.53 $\mu$m to 1.565 $\mu$m) on the basis of the specific wavelength determined depending on the first gas, and L band (1.565 $\mu$m to 1.625 $\mu$m) on the basis of the specific wavelength determined depending on the second gas.

In order to achieve the above-described object, according to a sixteenth aspect of the present invention, there is provided the method of detecting rotation angles of a diffracting portion according to the thirteenth aspect, wherein the light emitted from the absorption cell in the reference wavelength light source has a plurality of absorption lines in each wavelength region, and the signal processor calculates the rotation angle determining whether or not the light received by the reference photodetector corresponds to the absorption line of which wavelength from the level change of the diffracted light issued from the diffracting portion, by making use of the characteristic that the plural absorption lines of each wavelength region have mutually different absorption rates in each absorption line.

In order to achieve the above-described object, according to a seventeenth aspect of the present invention, there is provided the method of detecting rotation angles of a diffracting portion according to the thirteenth aspect, further comprising:

receiving a set wavelength value and issuing to the drive unit angle data to drive so that the predetermined optical element of the diffracting portion may be set at a rotation angle corresponding to the wavelength value, by a rotation angle setting unit having angle-wavelength data; and correcting the angle-wavelength data possessed in the rotation angle setting unit based on the plural specific rotation angles corresponding to the plural specific wavelengths in each wavelength region, by a data correcting unit.

In order to achieve the above-described object, according to an eighteenth aspect of the present invention, there is provided the method of detecting rotation angles of a diffracting portion according to seventeenth aspect, further comprising:

feeding correction data from the data correcting unit to the drive unit in order to correct the angle of the predetermined optical element of the diffracting portion prior to spectrum analysis of the light to be measured, being applied in analysis of spectrum of the light to be measured.

In order to achieve the above-described object, according to a nineteenth aspect of the present invention, there is provided the method of detecting rotation angles of a diffracting portion according to the eighteenth aspect, further comprising:

receiving the diffracted light of the light to be measured while the predetermined optical element of the diffracting portion is rotating according to the set wavelength value, and converting the diffracted light into an electric signal, by a measuring photodetector; and issuing the electric signal issued from the measuring photodetector by relating to the set wavelength value, by a spectrum processor.

In order to achieve the above-described object, according to a twentieth aspect of the present invention, there is provided the method of detecting rotation angles of a diffracting portion according to the eighteenth aspect, further comprising:

receiving the diffracted light of the light to be measured while the predetermined optical element of the diffracting portion is rotating according to the set wavelength value, and converting the diffracted light into an electric signal, by a measuring photodetector; and determining an electric signal at the set wavelength value based on the angle-wavelength data corrected by the data correcting unit, from the electric signal issued by the measuring photodetector, and issuing by relating the set wavelength value with the electric signal, by a spectrum processor.

In order to achieve the above-described object, according to a twenty first aspect of the present invention, there is provided the method of detecting rotation angles of a diffracting portion according to the nineteenth aspect, further comprising:

changing over between the light from the reference wavelength light source and the light to be measured.

In order to achieve the above-described object, according to a twenty second aspect of the present invention, there is provided the method of detecting rotation angles of a diffracting portion according to the nineteenth aspect, further comprising realizing the reference photodetector and measuring photodetector by one common unit.

In order to achieve the above-described object, according to a twenty third aspect of the present invention, there is provided the method of detecting rotation angles of a diffracting portion according to the seventeenth aspect, further comprising:

being used in a tunable wavelength light source of external resonance type which reflects the light between the diffracting portion and the light source, and issues the resonating tunable wavelength light;

feeding correction data from the data correcting unit to the drive unit in order to correct the rotation angle of the predetermined optical element of the diffracting portion prior to output the tunable wavelength light from the tunable wavelength light source of external resonance type.

In order to achieve the above-described object, according to a twenty fourth aspect of the present invention, there is provided the method of detecting rotation angles of a diffracting portion according to the twenty third aspect, further comprising:

changing over between the reference wavelength light source and the main light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Figure 1:
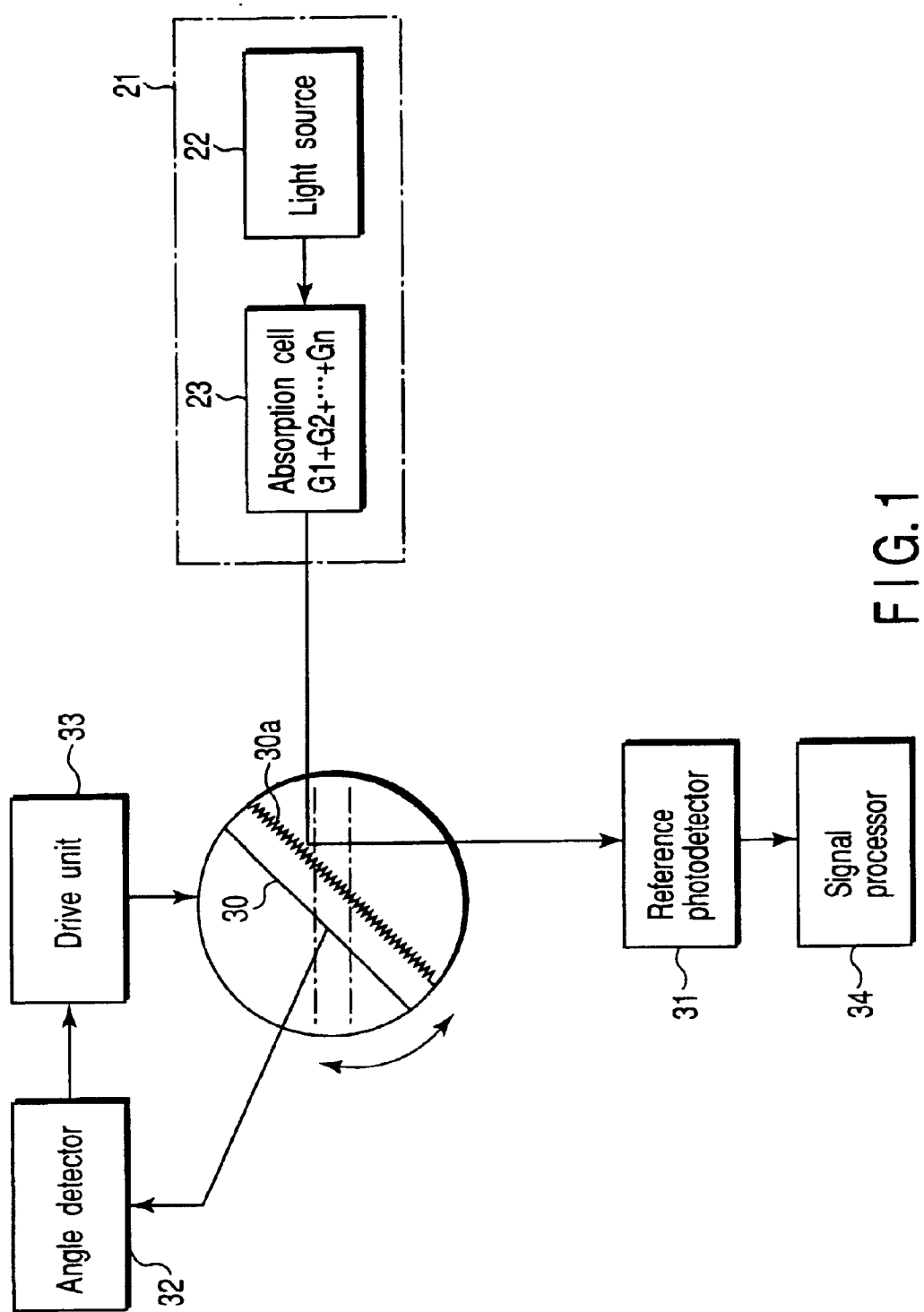
FIG. 1 is a block diagram showing a configuration of an apparatus for detecting rotation angles of a diffracting portion according to a first embodiment of the invention.

Reference will now be made in detail to the presently preferred embodiments of the invention as illustrated in the accompanying drawings, in which like reference numerals designate like or corresponding parts.

Referring now to the drawings, preferred embodiments of the invention are described in detail below.

(First Embodiment)

FIG. 1 is a block diagram showing a configuration of an apparatus for detecting rotation angles of a diffracting portion according to a first preferred embodiment of the invention which can be applied in optical appliances such as an optical spectrum analyzer and a tunable wavelength light source.

As shown in FIG. 1, this apparatus for detecting rotation angles of a diffracting portion comprises a wavelength reference light source 21, a diffraction grating 30, a reference photodetector 31, an angle detector 32, a drive unit 33, and a signal processor 34.

The wavelength reference light source 21 is composed of a light source 22 and an absorption cell 23 for emitting reference light as the reference of wavelength.

The light source 22 is either a white light source or SLD (super luminescent diode), and emits a wide band light almost uniform in intensity in a desired wavelength region.

The absorption cell 23 is sealed with a plurality of gases G1, G2, . . . , Gn of different kinds having mutually different in the wavelength region in which absorption lines exist as mentioned below.

The wavelength regions in which absorption lines of the plurality of gases G1, G2, . . . , Gn are in a wavelength range of reference light from the light source 22, and are apart from each other at a predetermined wavelength interval.

The plurality of gases may include, for example, carbon dioxide ($CO_2$) of which absorption line wavelengths are concentrated around 1.43 $\mu$m, acetylene gas ($C_2H_2$) of which absorption line wavelengths are concentrated around 1.53 $\mu$m, and methane gas ($CH_4$) of which absorption line wavelengths are concentrated around 1.65 $\mu$m.

For example, when the absorption cell 23 is sealed with two kinds of gases G1, G2, acetylene gas ($C_2H_2$) may be used as the first gas G1, and methane gas ($CH_4$) as the second gas G2.

Or, using acetylene gas ($C_2H_2$) as the first gas G1, carbon dioxide ($CO_2$) may be used as the second gas.

Of course, carbon dioxide ($CO_2$), acetylene gas ($C_2H_2$), and methane gas ($CH_4$) may be used as the first to third gases.

Figure 2A:
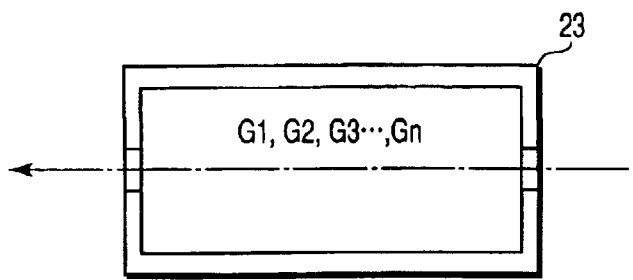
FIGS. 2A and 2B are diagrams showing essential parts in FIG. 1.

The absorption cell 23 sealed with these plurality of gases G1, G2, . . . , Gn of different kinds having mutually different in the wavelength region in which the absorption line wavelengths exist may have the plurality of gases G1, G2, . . . , Gn mixed at a predetermined mixing ratio in a common space in a tubular container, for example, as shown in FIG. 2A.

Figure 2B:
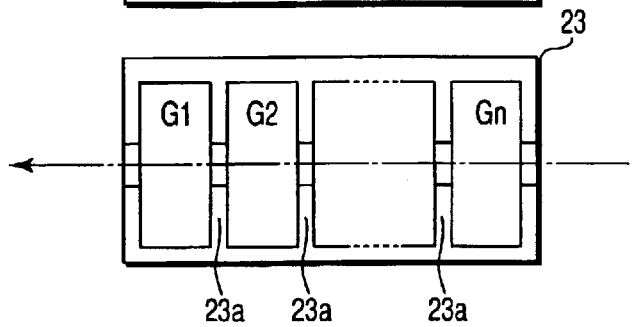

Or, as shown in FIG. 2B, the inside of a light permeable tubular container may be partitioned by walls 23a, and different gases G1, G2, . . . , Gn may be individually charged in the plural partitioned spaces.

When a reference light of a wide range emitted from the light source 22 is put into the absorption cell 23 having such configuration, the light is absorbed in different wavelength bands by the gases G1, G2, . . . , Gn in the absorption cell 23.

Figure 3:
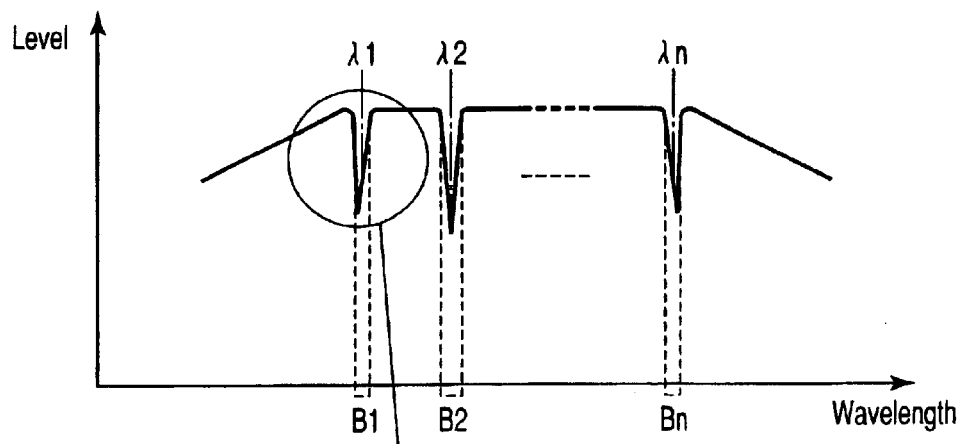
FIG. 3 is a diagram showing the spectrum of light emitted from the essential parts in FIG. 1.
Figure 3:
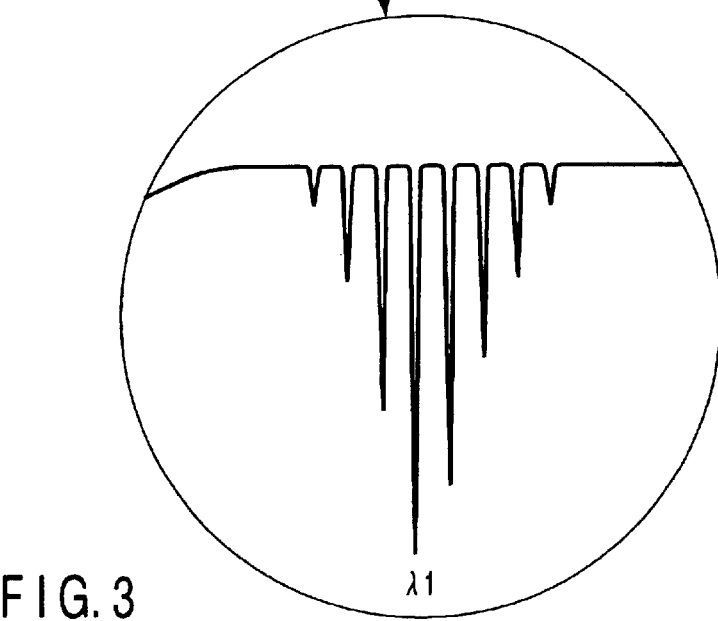
Figure 4:
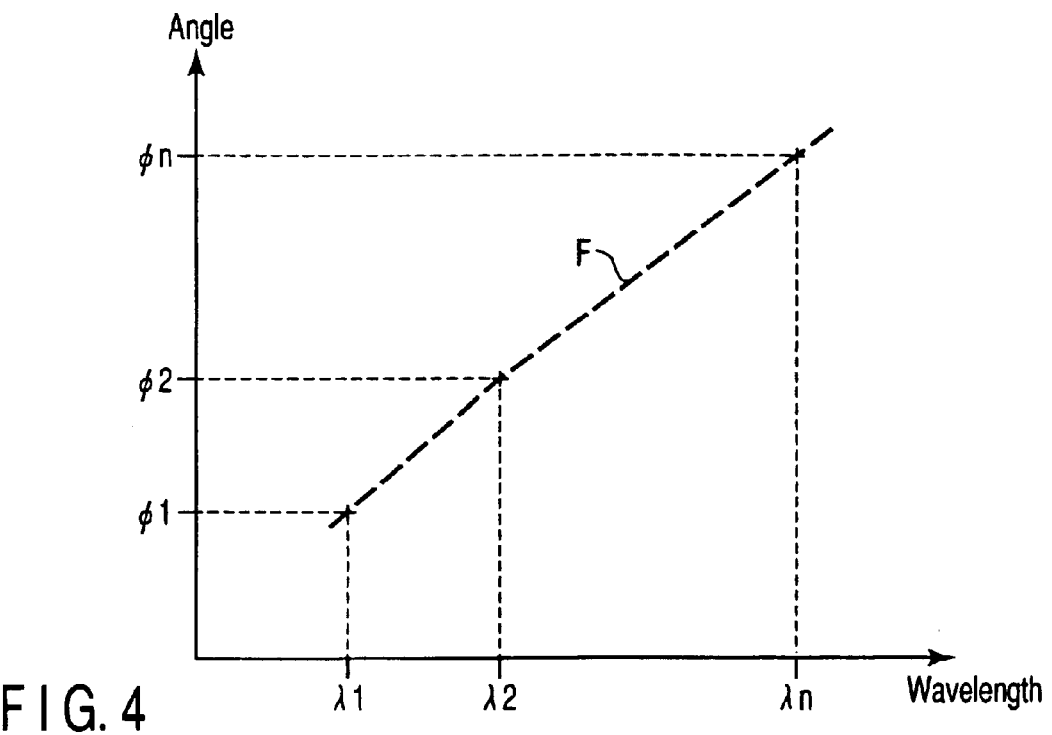
FIG. 4 is a characteristic diagram showing the angle-wavelength relation to be applied in the apparatus for detecting rotation angles of a diffracting portion in FIG. 1.

The spectrum of the light (reference light) passing through the absorption cell 23 is substantially lowered in intensity in wavelength regions B1, B2, . . . , Bn in which absorption lines of gases G1, G2, . . . , Gn exist as shown in FIG. 3.

The absorption line wavelengths by gases G1, G2, . . . , Gn of the absorption cell 23 are shown in magnified view in FIG. 3, in which there are plural wavelengths each in wavelength regions B1, B2, . . . , Bn, and the absorption rates of the plurality of absorption line wavelengths are not uniform.

Therefore, herein, the absorption line wavelength of the maximum absorption rate is expressed as representative values $\lambda 1, \lambda 2, \ldots, \lambda n$ of absorption line wavelengths of gases G1, G2, . . . , Gn, and they are called specific wavelengths.

On the other hand, the diffraction grating 30 composes the diffracting portion and predetermined optical element of this embodiment, and it receives the reference light by the plane having parallel grooves 30a, and diffracts the wavelength components contained in the reference light in the direction depending on the wavelength.

The relation between the angle and diffracted light of the diffraction grating 30 is known to be expressed as follows.

$$m\lambda = A \sin \theta \quad (1)$$

where m is the diffraction degree of diffracted light, $\lambda$ is the wavelength, A is a constant determined by the optical system, and $\theta$ is the displacement angle of the diffraction grating on the basis of the angle when receiving light of degree 0.

The reference photodetector 31 receives the light diffracted from the diffraction grating 30 in a predetermined direction (for example, diffracted light of degree 1), and issues an electric signal according to the intensity.

The angle detector 32 is composed of, for example, an encoder coupled to the axis of rotation of the diffraction grating 30, and detects the angle from the reference position of the diffraction grating 30.

The drive unit 33 rotates and drives the diffraction grating 30 in a predetermined angle range.

This drive unit 33 may be designed to continue to rotate the diffraction grating 30 until the angle designated from outside coincides with the angle detected by the angle detector 32.

Or the drive unit 33 may be also configured so as to store the data showing the angle-wavelength relation of the diffraction grating 30 preliminarily, read out the angle corresponding to the wavelength designated from outside, and rotate the diffraction grating 30 until the angle detected by the angle detector 32 coincides with the data being read out.

The signal processor 34 is composed of a microcomputer, and, for example, by rotating the diffraction grating 30 by the drive unit 33, it detects an extreme values of an electric signal (in this case, the value of the signal when the intensity of the received light is minimal) from the reference photodetector 31, receives the rotation angle detected by the angle detector 32 when detecting this extremal value, and determines the specific rotation angle $\phi$ corresponding to the specific wavelength $\lambda$.

This signal processor 34 is designed to obtain rotation angles $\phi 1, \phi 2, \ldots, \phi n$ issued by the angle detector 32 as specific rotation angles, respectively, when the lights of specific wavelengths $\lambda 1, \lambda 2, \ldots, \lambda n$ determined by the gases G1, G2, . . . , Gn sealed in the absorption cell 23 are received in the reference photodetector 31.

As the plurality of gases sealed in the absorption cell 32, when acetylene gas ($C_2H_2$) of which absorption line wavelengths are concentrated around 1.53 $\mu$m is used as the first gas and methane gas ($CH_4$) of which absorption line wavelengths are concentrated around 1.65 $\mu$m is used as the second gas, this signal processor 34 determines the first and second specific rotation angles $\phi 1, \phi 2$ corresponding to the first and second specific wavelengths determined depending on the first and second gases sealed in the absorption cell 32, and also determines the rotation angle between the first and second specific rotation angles $\phi 1, \phi 2$ by a predetermined complementary operation including linear complement.

In the apparatus for detecting rotation angles of a diffracting portion having such configuration, while rotating the diffraction grating 30 by the signal processor 34 through the drive unit 33, for example, to a maximum rotation angle from the reference position, the rotation angle issued from the angle detector 32 and the electric signal issued from the reference photodetector 31 are stored in correspondence to each other.

Accordingly, the signal processor 34 determines the rotation angles $\phi1, \phi2, \ldots, \phi n$ when the intensity of the received light becomes minimum in the wavelength regions B1, B2, ..., Bn corresponding to the gases G1, G2, ..., Gn in the absorption cell 23 from the stored data, respectively as specific rotation angles corresponding to the specific wavelengths $\lambda1, \lambda2, \ldots, \lambda n$.

Therefore, this apparatus for detecting rotation angles of a diffracting portion can accurately determine the angle-wavelength relation of the diffraction grating 30 from these plurality of the specific rotation angles $\phi1, \phi2, \ldots, \phi n$ and specific wavelengths $\lambda1, \lambda2, \ldots, \lambda n$, and on the basis of the determined angle-wavelength relation, the wavelength precision of the apparatus 1 can be almost uniformly enhanced in a wide wavelength range.

For example, as mentioned above, if the specific rotation angles $\phi1, \phi2, \ldots, \phi n$ and specific wavelengths $\lambda1, \lambda2, \ldots, \lambda n$ correspond to each other by characteristic F, the signal processor 34 issues the information of the angle corresponding to the desired wavelength on the basis of this characteristic to the drive unit 33, or updates the data expressing the angle-wavelength relation stored in the drive unit 33 by this characteristic F.

Figure 5:
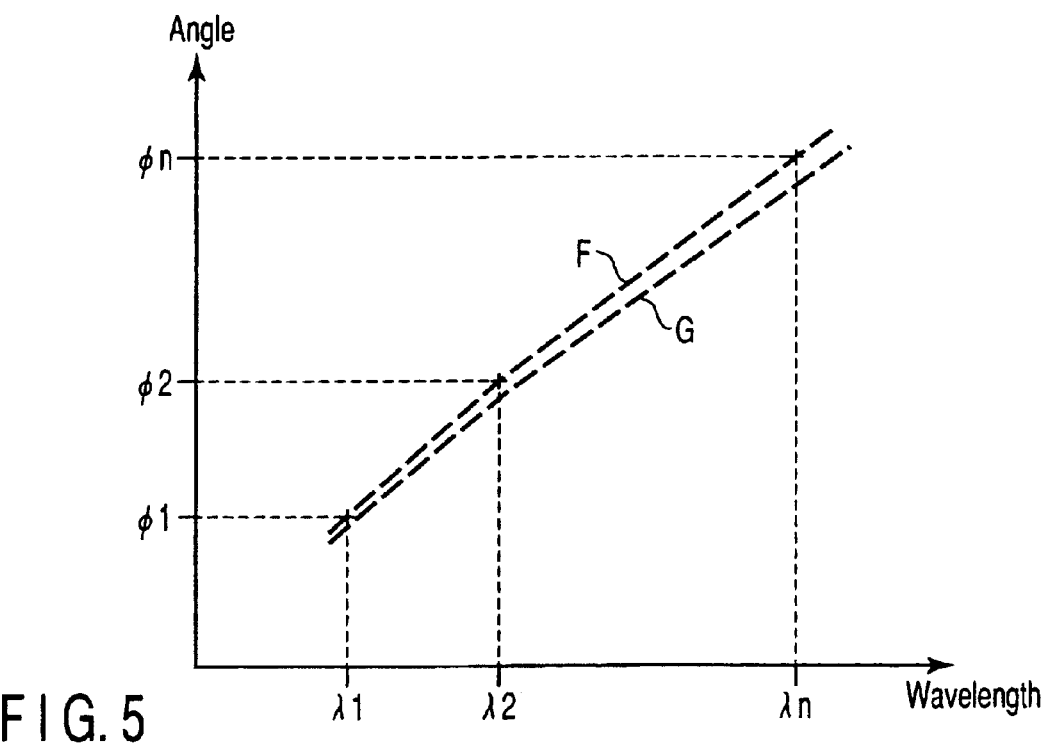
FIG. 5 is a characteristic diagram showing the angle-wavelength relation to be applied in the apparatus for detecting rotation angles of a diffracting portion in FIG. 1.

If the characteristic of the data expressing the angle-wavelength relation stored in the drive unit 33 is expressed by G in FIG. 5, and this characteristic G cannot be changed, the signal processor 34 determines the difference between the characteristic G and characteristic F, and corrects the designated wavelength or designated angle by this difference.

As mentioned above, as the plurality of gases sealed in the absorption cell 32, when acetylene gas ($C_2H_2$) of which absorption line wavelengths are concentrated around 1.53 $\mu$m is used as the first gas and methane gas ($CH_4$) of which absorption line wavelengths are concentrated around 1.65 $\mu$m is used as the second gas, this signal processor 34 determines the first and second specific rotation angles $\phi1$, $\phi2$ corresponding to the first and second specific wavelengths determined depending on the first and second gases sealed in the absorption cell 32, and also determines the rotation angle between the first and second specific rotation angles $\phi1$, $\phi2$ by predetermined complementary operation including linear complement.

Therefore, the apparatus for detecting rotation angles of a diffracting portion of this preferred embodiment is designed to cover the wavelength region of the light in part of the S band (1.46 gm to 1.53 $\mu$m) and C band (1.53 $\mu$m to 1.565 $\mu$m) on the basis of the specific wavelength determined depending on the first gas, and L band (1.565 $\mu$m to 1.625 $\mu$m) on the basis of the specific wavelength determined depending on the second gas.

(Second Preferred Embodiment)

A second preferred embodiment of the invention relates to a configuration of an optical appliance in which the apparatus for detecting rotation angles of a diffracting portion of the first preferred embodiment is applied.

Figure 6:
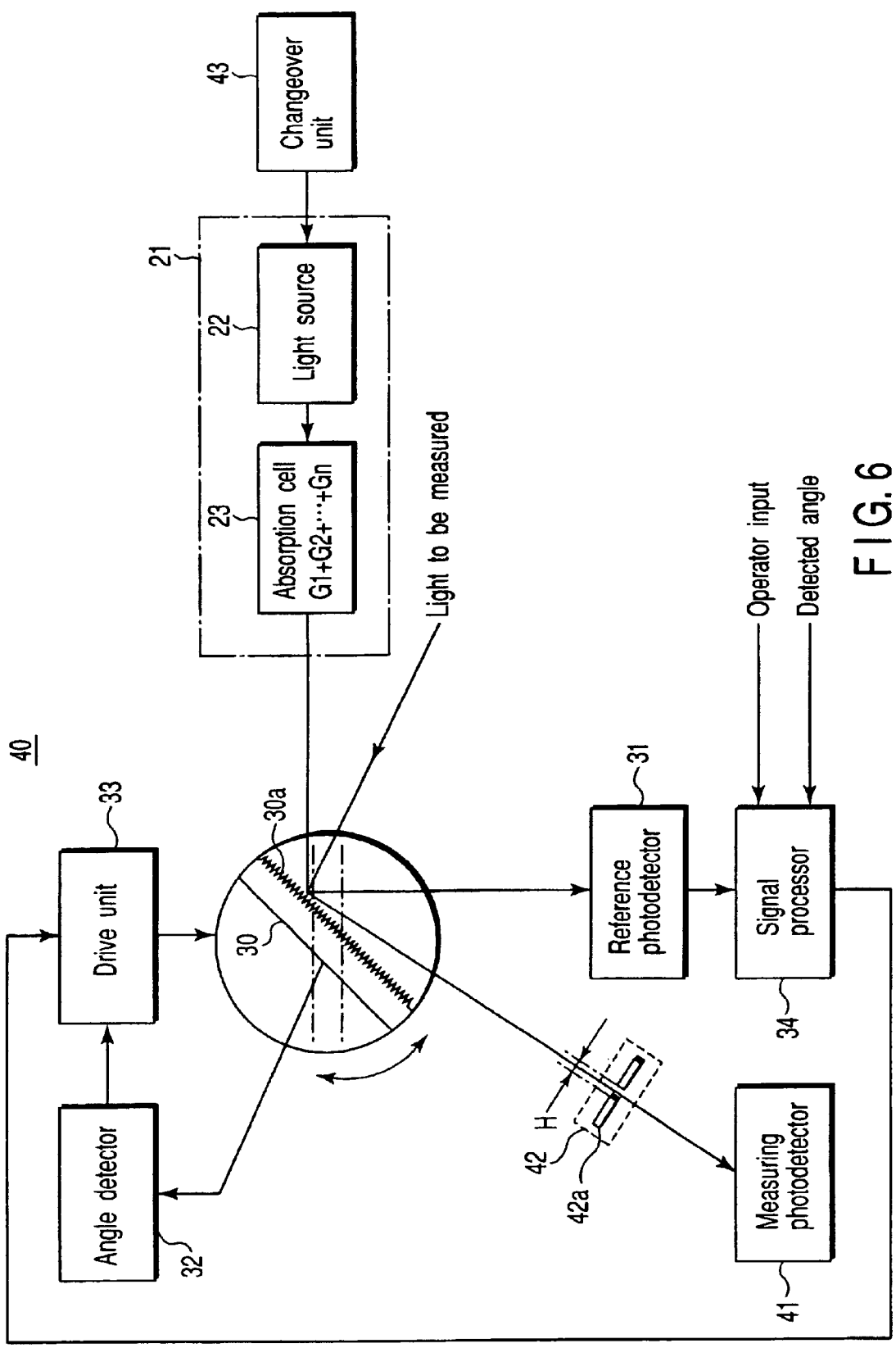
FIG. 6 is a block diagram showing a configuration of an optical spectrum analyzer in which the apparatus for detecting rotation angles of a diffracting portion of the invention is applied as a second embodiment of the invention.

FIG. 6 is a block diagram showing a configuration of an optical spectrum analyzer 40 in which the above apparatus for detecting rotation angles of a diffracting portion is applied.

This optical spectrum analyzer 40 comprises a measuring photodetector 41, a slit mechanism 42, and a changeover unit 43, in addition to the configuration of the above apparatus for detecting rotation angles of a diffracting portion.

In FIG. 6, the reference light from the wavelength reference light source 21 and the light to be measured are shown to enter different positions in the diffraction grating 30, but actually they enter the same position or extremely close positions.

The measuring photodetector 41 receives the diffracted light of the light to be measured entering the diffraction grating 30, and converts the diffracted light into an electric signal expressing the intensity of this light.

This measuring photodetector 41 is disposed at a position for receiving the diffracted light of the same wavelength and a different degree from the predetermined degree when the reference photodetector 41 receives a diffracted light of a certain wavelength and a predetermined degree (for example, degree 1).

The slit mechanism 42 is disposed on the optical axis between the diffraction grating 30 and measuring photodetector 36.

This slit mechanism 42 reduces the diffracted light emitted as being spread widely from the diffraction grating 30 to the measuring photodetector 41 by means of a slit 42a, and prevents undesired light from entering the measuring photodetector 41.

By varying the slit width H of the slit mechanism 42, reduction of beam of diffracted light from the diffraction grating 30 is set in an optimum state, so that the spectral resolution of the diffraction grating 30 can be enhanced.

The changeover unit 43 is a switch to be manipulated by the operator, and is designed to turn on or off the wavelength reference light source 21 in order to prevent interference of light to be measured and reference light.

Herein, instead of on/off switching of the wavelength reference light source 21, it may be designed to change over so that either the reference light from the wavelength reference light source 21 or the light to be measured may be entered into the diffraction grating 30.

Further, the changeover device 43 may be omitted by entering the reference light from the wavelength reference light source 21 and the light to be measured by deviating in the length direction or width direction of the diffraction grating 30.

In the optical spectrum analyzer 40 having such a configuration, the diffraction grating 30 is rotated and driven up to the angle position where the diffracted light of a predetermined degree of a wavelength set by the operator, for example, the wavelength in the wavelength region B1 is entered into the reference photodetector 31.

In this state, the changeover unit 38 is turned on, and a wide band light is emitted from the light source 22 of the wavelength reference light source 21 to the absorption cell 23.

The absorption cell 23 absorbs the lights of absorption wavelength regions B1, B2, ..., Bn determined by the plurality kind of gases G1, G2, ..., Gn sealed inside from the incident wide band light, and emits the light absorbing the lights of these absorption wavelength regions B1, B2, ..., Bn to the diffraction grating 30 as reference light.

The diffraction grating 36 diffracts the incident reference light, and the diffracted light of a predetermined degree is emitted to the reference photodetector 31.

The reference photodetector 31 issues an electric signal corresponding to the intensity of the received light to the signal processor 34.

The signal processor 34, when the angle of the diffraction grating 30 is varied by the drive unit 32 in an angle range corresponding to the width of the wavelength region B1, determines the detection angle of the angle detector 32 when the electric signal from the reference photodetector 31 receives the light low in intensity in the wavelength region B1 and becomes an extreme value (for example, a minimal value), as the specific angle φ1 corresponding to the specific wavelength λ1.

In a different method of determining the specific angle φ1 corresponding to the specific wavelength λ1, since the gas absorption rate of the absorption line in the wavelength region B1 is constant, the waveform pattern in the wavelength region B1 is stored preliminarily, and when the angle of the diffraction grating 30 is varied by the drive unit 32, the detection angle of the angle detector when the electric signal from the reference photodetector 31 coincides with the waveform pattern of the wavelength region B1 is determined as the specific angle φ1 corresponding to the specific wavelength λ1.

However, the method of determining the specific angle φ1 corresponding to the specific wavelength λ1 is not limited to these methods alone.

The signal processor 34 puts the specific angle φ1 and specific wavelength λ1 in formula (1) to obtain constant A, and stores this logarithm A1 as the data for relating the angle and wavelength of the diffraction grating 30 near the wavelength region B1.

The signal processor 34 similarly processes in the wavelength regions B2, . . . , Bn, and determines the constants A2, . . . , An showing the relation of angle and wavelength of the diffraction grating 30 near the wavelength regions B2, . . . , Bn.

Further, the signal processor 34, when the data showing the angle-wavelength relation is stored in, for example, the drive unit 33 in a variable state, determines the data of the characteristic F on the basis of these constants A1, A2, . . . , An, and updates the data in the data drive unit 33 of this characteristic F.

On the other hand, when the data showing the angle-wavelength relation is stored in the drive unit 33 in an invariable state, the signal processor 34 determines the data of the characteristic F on the basis of these constants A1, A2, . . . , An, further determines the difference between the data of this characteristic F and the angle-wavelength relation data stored in the drive unit 33, and sets them in the drive unit 33, so that this difference is corrected in the drive unit 33.

Therefore, the drive unit 33 can control the angle of the diffraction grating to the angle accurately corresponding to the desired wavelength by the data updated on the basis of the constants A2, . . . , An or correction data.

In this manner, the optical spectrum analyzer 40 according to the apparatus for detecting rotation angles of a diffracting portion of the invention determines the correct angle-wavelength relation of the diffraction grating 30 in the present environments, turns off the changeover unit 43, stops emission of reference light from the wavelength reference light source 21 to the diffraction grating 30, and feeds the light to be measured into the diffraction grating 30.

In this state, by rotating the diffraction grating 30 in a designated angle range, the measuring photodetector 41 receives the light of the wavelength corresponding to the angle of the diffraction grating 30, and issues an electric signal depending on the intensity of light in each wavelength to the signal processor 34.

The signal processor 34 detects the wavelength distribution characteristic of the light to be measured on the basis of the electric signal issued from the measuring photodetector 41 and the accurate angle-wavelength relation.

In the optical spectrum analyzer 40 having such configuration, by using the absorption cell sealed with a plurality kind of gases extremely small in wavelength fluctuations due to environmental conditions prior to measurement of the light, the angle-wavelength relation of the diffraction grating 30 can be determined accurately in a wide wavelength range, and the wavelength distribution characteristic of the light can be determined accurately in a wide range.

The optical spectrum analyzer 40 using the detection apparatus of rotation angles of a diffracting portion of the invention is explained, but the detection apparatus of rotation angles of a diffracting portion of the invention can be also applied in a tunable wavelength light source.

(Third Preferred Embodiment)

Figure 7:
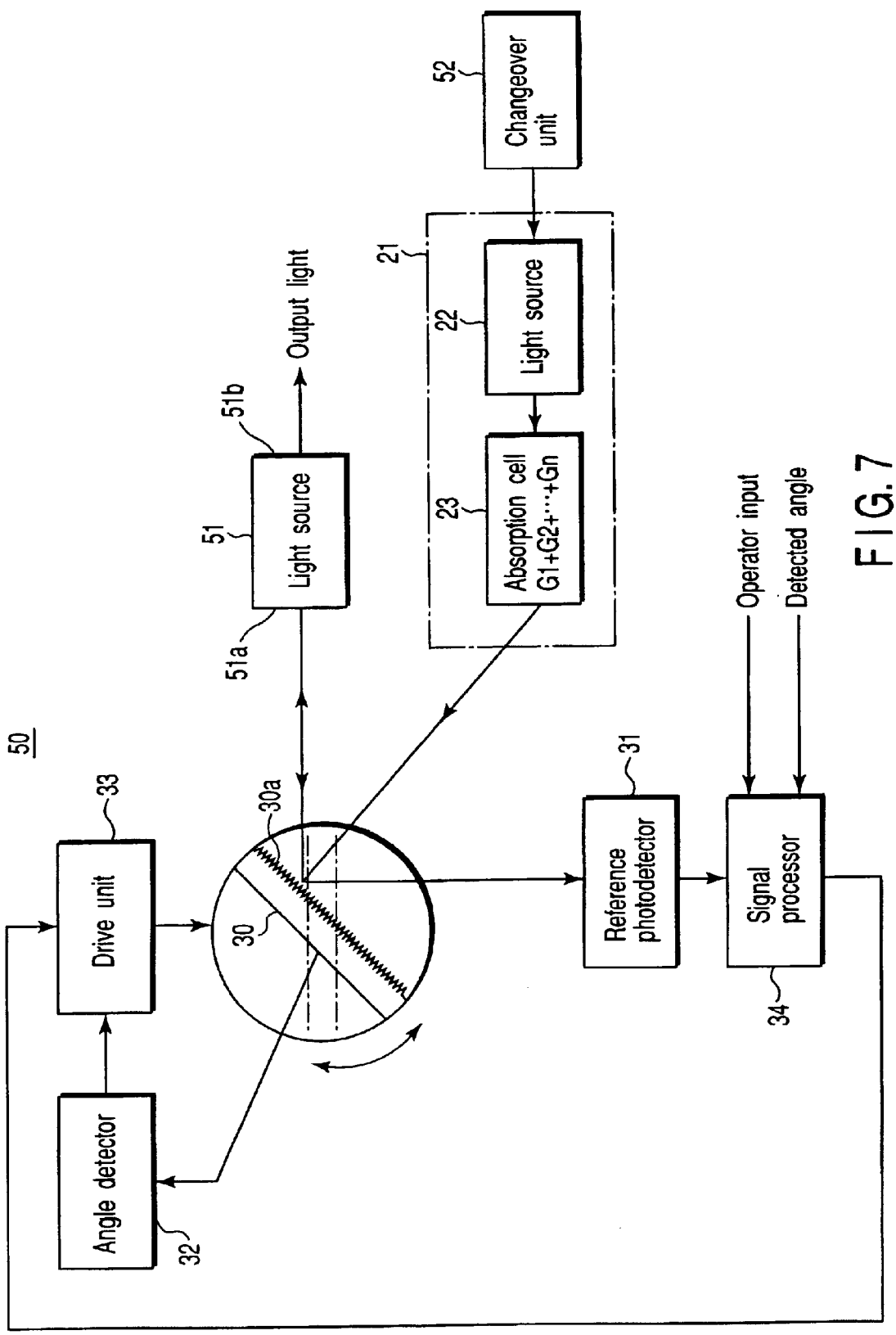
FIG. 7 is a block diagram showing a configuration of a tunable wavelength light source in which the apparatus for detecting rotation angles of a diffracting portion of the invention is applied as a third embodiment of the invention.

FIG. 7 is a block diagram showing a configuration of a tunable wavelength light source 50 in a third preferred embodiment of the invention in which the apparatus for detecting rotation angles of a diffracting portion of the first preferred embodiment of the invention is applied.

The tunable wavelength light source 50 comprises a main light source 51 and a changeover unit 52, in addition to the configuration of the apparatus for detecting rotation angles.

In FIG. 7, the reference light from the wavelength reference light source 21 and the light from the main light source 51 are shown to enter different positions in the diffraction grating 30, but actually they enter the same position or extremely close positions.

The tunable wavelength light source 50 is a tunable wavelength light source of external resonance type by commuting the light between an end 51a of the main light source 51 composed of laser diode and the diffraction grating 30 disposed on its optical axis, and emitting the resonating light from other end 51b.

As mentioned above, the tunable wavelength light source 50 is disposed at a position for receiving a diffracted light of the same wavelength and a different degree from the predetermined degree when the reference photodetector 41 receives a diffracted light of a certain wavelength and a predetermined degree (for example, degree 1).

The changeover unit 52 is a switch to be manipulated by the operator.

This changeover unit 52 is designed to turn on or off the wavelength reference light source 21 in order to prevent interference of the light from the main light source 51 and the light from the wavelength reference light source 21.

The changeover unit 52 may be also designed to change over so that either the light from the main light source 51 or the light from the wavelength reference light source 21 may be entered into the diffraction grating 30.

Or the changeover device 52 may be omitted by entering the reference light from the wavelength reference light source 21 and the light from the main light source 51 by deviating in the length direction or width direction of the diffraction grating 30.

In the tunable wavelength light source 50 having such configuration, prior to output of light of desired wavelength, as in the case of the optical spectrum analyzer 40, in the incident state of the reference light of the wavelength reference light source 21 in the diffraction grating 30, by varying the angle of the diffraction grating 30, the angles when the reference photodetector 31 receives diffracted lights of specific wavelengths λ1, λ2, . . . , λn in absorption wavelength regions B1, B2, . . . , Bn are obtained as specific angles φ1, φ2, . . . , φn, and the data A1, A2, . . . , An are determined on the basis of these specific angles φ1, φ2, . . . , φn and specific wavelengths λ1, λ2, . . . , λn.

The tunable wavelength light source 50 determines the data for accurately expressing the angle-wavelength region of the diffraction grating 30 from the data A1, A2, . . . , An, sets it in the drive unit 33, changes over from the wavelength reference light source 21 to the main light source 51, designates a desired wavelength, and sets the diffraction grating 30 at an angle exactly corresponding to the desired wavelength, so that the light of the desired wavelength can be issued from the main light source 51.

In the case of the tunable wavelength light source 50, too, by using the absorption cell preliminarily sealed with a plurality of gases extremely small in wavelength fluctuations due to environmental conditions, the angle-wavelength relation of the diffraction grating 30 can be determined accurately in a wide wavelength range, and hence the precision of the wavelength of output light can be maintained at a high level in a wide wavelength range.

In the foregoing embodiments, the diffracted light of degree 1 (m=1) of the diffraction grating is received by the reference photodetector 31, and the related data of angle and wavelength is obtained, but by further rotating the diffraction grating, diffracted light of degree 2 and diffracted light of degree 3 can be sequentially received, and the related data of angle and wavelength is determined, so that the angle-wavelength relation can be obtained to a higher precision.

(Fourth Preferred Embodiment)

Figure 8:
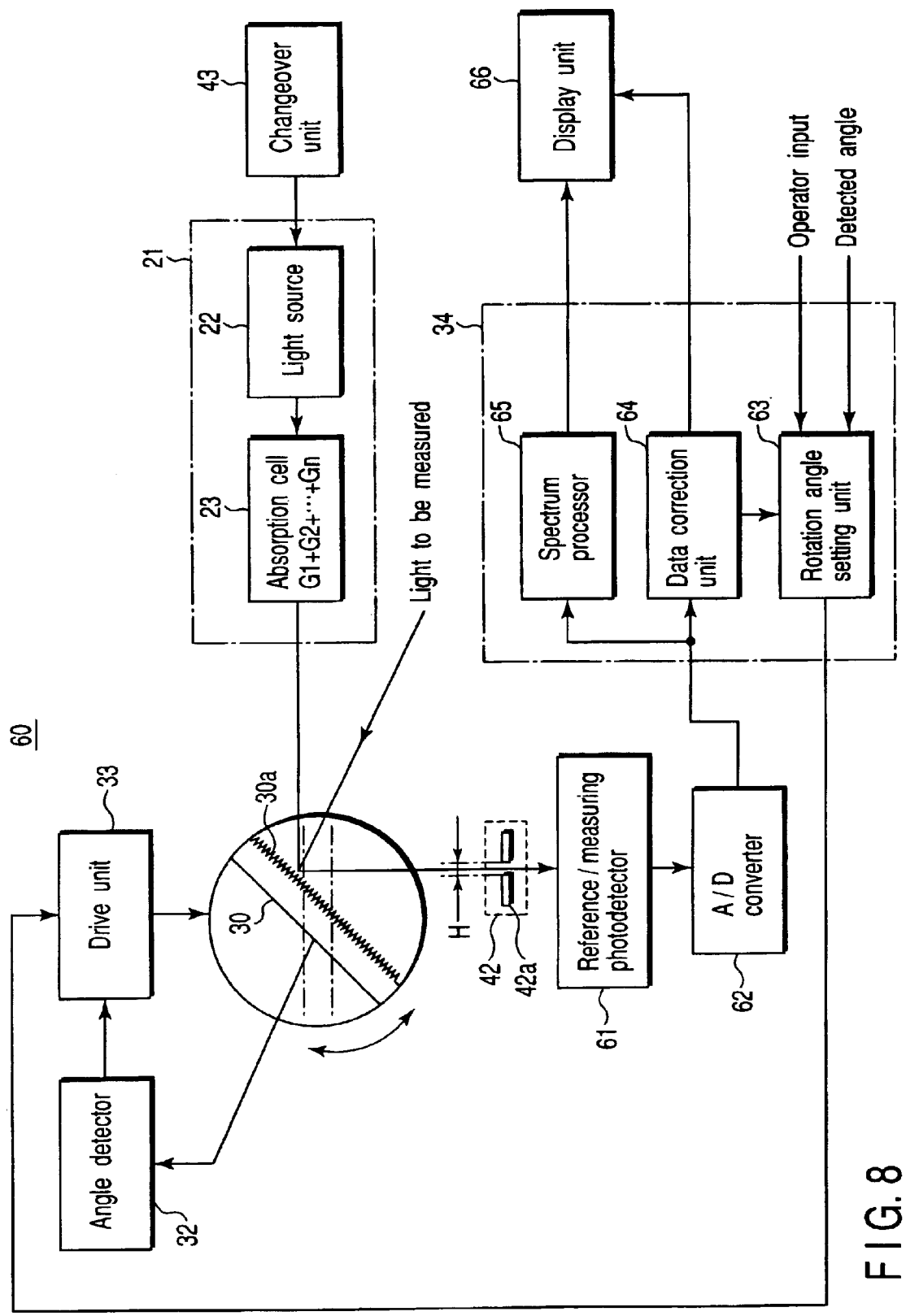
FIG. 8 is a block diagram showing a configuration of an optical spectrum analyzer in which the apparatus for detecting rotation angles of a diffracting portion of the invention is applied as a fourth embodiment of the invention.

In the above embodiments, the data for relating the angle and wavelength of the diffraction grating 30 accurately is issued to the drive unit 33, but in a configuration of an optical spectrum analyzer 60 having a display unit 66 for displaying the spectrum as shown in FIG. 8 in a fourth preferred embodiment, the wavelength axis on the display screen of the display unit 66 can be calibrated by the data showing the angle-wavelength relation obtained on the basis of the data A1, A2, . . . , An calculated by the signal processor 34.

In the optical spectrum analyzer 60 shown in FIG. 8, a reference/measuring photodetector 61 is used to serve as both reference photodetector 31 and measuring photodetector 41 of the optical spectrum analyzer 40, and diffracted lights of the same degree are received as for reference light and measuring light.

The mode of changing over and receiving the diffracted lights from the diffraction grating 30 corresponding to the reference light or measuring light in this reference/measuring photodetector 61 is the same as in the case of the optical spectrum analyzer 40.

The electric signal from the reference/measuring photodetector 61 is converted from analog to digital by an A/D converter 62, of which explanation is omitted, in the apparatus for detecting rotation angles or the optical spectrum analyzer 40, and is input to the signal processor 34.

In this case, a rotation angle setting unit 63 provided in the signal processor 34 has the angle-wavelength data stored preliminarily in a table format, and receives the value of wavelength set by the operator, and issues angle data to the drive unit 33 for driving so that the diffraction grating 30 may be set to the rotation angle corresponding to the set wavelength.

A data correction unit 64 provided in the signal processor 34 calculates data as mentioned above by receiving the digital data from the A/D converter 62 when the reference light is selected by the changeover unit 43.

The data thus calculated in the data correction unit 64 is issued to the display unit 66 and rotation angle setting unit 63.

The display unit 66 displays the spectrum wavelength on the basis of the data.

The rotation angle setting unit 63 corrects the angle-wavelength related data on the basis of the data, issues the corrected angle data to the drive unit 33, and sets the diffraction grating 33 at an angle precisely corresponding to the desired wavelength.

The signal processor 34 and spectrum processor 65 process, in a state being changed over to the light to be measured by the changeover unit 43, the digital signal from the A/D converter 62 and the corresponding wavelength for displaying as spectrum data, and supplies this to the display unit 66.

In the configuration of the signal processor 34 shown in FIG. 8, principal parts are incorporated in the signal processor 34 of the optical spectrum analyzer.

In the apparatus for detecting rotation angles of a diffracting portion explained above, the optical element for composing the diffracting portion is the diffraction grating 30 only, but the optical element for composing the diffracting portion is not limited to the diffraction grating, and may include a reflector for reflecting the diffracted light from the diffraction grating to the diffraction grating, and the invention may be also applied in a system for varying the wavelength by rotating the reflector relatively to the diffraction grating.

In this case, the apparatus for detecting rotation angles of a diffracting portion detects the rotation angle of the reflector, instead of that of the diffraction grating.

As explained herein, the apparatus for detecting rotation angles of a diffracting portion of the invention comprises a diffracting portion composed of optical elements including a predetermined optical element for diffracting the light, a drive unit for rotating the predetermined optical element of the diffracting portion, an angle detector for detecting the rotation angle of the predetermined optical element, a reference wavelength light source including a light source, and an absorption cell, for emitting the reference light of a specific wavelength determined depending on the absorption cell toward the diffracting portion, a reference photodetector for receiving a diffracted light emitted in a predetermined direction from the diffracting portion receiving the reference light from the reference wavelength light source, and converting the diffracted light into an electric signal, and a signal processor for receiving a rotation angle issued by the angle detector when detecting a predetermined value of electric signal from the reference photodetector by rotating the predetermined optical element by the drive unit, and determining the predetermined rotation angle corresponding to the specific wavelength, in which the absorption cell is sealed with a plurality of gases of different kinds having mutually different in the wavelength region in which absorption lines exist, and the signal processor is designed to determine plural specific rotation angles corresponding to the specific wavelength determined depending on the plurality kind of gases sealed in the absorption cell, and also determine the rotation angle between plural specific rotation angles by predetermined complementary calculation including linear complement.

Therefore, in a wide wavelength range including plural wavelength regions, the angle-wavelength relation of the predetermined optical element of the diffracting portion can be accurately obtained without being affected by changes in environmental conditions.

According to the optical spectrum analyzer to which the invention is applied, in a wide wavelength range including plural wavelength regions, the wavelength distribution characteristic of the light to be measured can be accurately obtained without being affected by changes in environmental conditions.

According to the tunable wavelength light source to which the invention is applied, in a wide wavelength range including plural wavelength regions, the light of accurate wavelength can be emitted without being affected by changes in environmental conditions.

Hence, the invention presents an apparatus and method of detecting rotation angles of a diffracting portion capable of accurately obtaining the angle-wavelength relation in a simple configuration and in a wide wavelength range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for detecting rotation angles of a diffracting portion comprising:

a diffracting portion which comprises optical elements including a predetermined optical element and which diffracts light;

a drive unit which rotates the predetermined optical element of the diffracting portion;

an angle detector which detects a rotation angle of the predetermined optical element;

a reference wavelength light source including a light source which emits wide-band reference light toward the diffracting portion, and an absorption cell which receives the wide-band reference light and in which a plurality of different gases are sealed, wherein each of the gases has wavelength regions in which absorption lines exist, the wavelength regions being different from each other, and wherein the reference light has specific wavelengths depending on the absorption cell;

a reference photodetector which receives diffracted light emitted in a predetermined direction from the diffracting portion receiving the reference light from the reference wavelength light source, and which converts the diffracted light into an electric signal; and a signal processor which receives the rotation angle detected by said angle detector when the signal processor detects a predetermined value including a minimum value of the electric signal produced by said reference photodetector according to the rotation angle of the predetermined optical element rotated by the drive unit, and which determines specific rotation angles corresponding to the specific wavelengths of the reference light, wherein the signal processor (a) causes the diffracting portion to rotate to a maximum rotatable angle from a reference position via the drive unit, and while rotating the diffracting portion to the maximum rotatable angle, associates data of rotation angles from the angle detector with data of electric signals from the reference photodetector and stores the associated data of rotation angles and electric signals, (b) obtains from the stored data the specific rotation angles corresponding to the specific wavelengths of the reference light when intensity of the received light within each of the wavelength regions corresponding to the gases in the absorption cell is at a minimum, depending on the gases sealed in the absorption cell, and (c) obtains rotation angles lying between the specific rotation angles corresponding to the specific wavelengths using the stored data by interpolation including linear interpolation.

2. The apparatus for detecting rotation angles of a diffracting portion according to claim 1, wherein the plurality of different gases sealed in the absorption cell include at least two gases selected from carbon dioxide ($CO_2$) of which absorption line wavelengths are concentrated around 1.43 $\mu$m, acetylene gas ($C_2H_2$) of which absorption line wavelengths are concentrated around 1.53 $\mu$m, and methane gas ($CH_4$) of which absorption line wavelengths are concentrated around 1.65 $\mu$m.

3. The apparatus for detecting rotation angles of a diffracting portion according to claim 1, wherein:

the plurality of different gases sealed in the absorption cell include a first gas whose absorption line wavelengths are concentrated around 1.53 $\mu$m and a second gas whose absorption line wavelengths are concentrated around 1.65 $\mu$m, and said signal processor determines first and second specific rotation angles corresponding to first and second specific wavelengths determined depending on the first and second gases sealed in the absorption cell, and determines the rotation angles between plural specific rotation angles by predetermined complementary calculation including linear complement, so as to cover the wavelength region of the light in part of S band (1.46 $\mu$m to 1.53 $\mu$m) and C band (1.53 $\mu$m to 1.565 $\mu$m) on the basis of the specific wavelength determined depending on the first gas, and L band (1.565 $\mu$m to 1.625 $\mu$m) on the basis of the specific wavelength determined depending on the second gas.

4. The apparatus for detecting rotation angles of a diffracting portion according to claim 1, wherein the light emitted from the absorption cell in the reference wavelength light source has a plurality of absorption lines in each wavelength region, and said signal processor calculates the rotation angle determining whether or not the light received by the reference photodetector corresponds to the absorption line of which wavelength from the level change of the diffracted light issued from the diffracting portion, by making use of the characteristic that the plural absorption lines of each wavelength region have mutually different absorption rates in each absorption line.

5. The apparatus for detecting rotation angles of a diffracting portion according to claim 1, further comprising:

a rotation angle setting unit which has angle-wavelength data and issues to the drive unit angle data for driving so that the predetermined optical element of the diffracting portion may be set at a rotation angle corresponding to the wavelength value, and a data correcting unit which corrects the angle-wavelength data possessed in the rotation angle setting unit based on the plural specific rotation angles corresponding to the plural specific wavelengths in each wavelength region.

6. The apparatus for detecting rotation angles of a diffracting portion according to claim 1, wherein the apparatus for detecting rotation angles of a diffracting portion is used for analyzing the spectrum of the light to be measured, and said signal processor has a feeding unit which feeds correction data from the data correcting means to the drive unit in order to correct the angle of the predetermined optical element of the diffracting portion prior to spectrum analysis of the light to be measured.

7. The apparatus for detecting rotation angles of a diffracting portion according to claim 6, further comprising:

a measuring photodetector which receives the diffracted light of the light to be measured while the predetermined optical element of the diffracting portion is rotating according to the set wavelength value, and converts the diffracted light into an electric signal, and a spectrum processor which issues the electric signal issued from the measuring photodetector by relating to the set wavelength value.

8. The apparatus for detecting rotation angles of a diffracting portion according to claim 6, further comprising:

a measuring photodetector which receives the diffracted light of the light to be measured while the predetermined optical element of the diffracting portion is rotating according to the set wavelength value, and converts the diffracted light into an electric signal, and a spectrum processor which determines an electric signal at the set wavelength value based on the angle-wavelength data corrected by the data correcting unit, from the electric signal issued by the measuring photodetector, and issues by relating the set wavelength value with the electric signal.

9. The apparatus for detecting rotation angles of a diffracting portion according to claim 8, further comprising a changing unit which changes over between the reference light from the reference wavelength light source and the light to be measured.

10. The apparatus for detecting rotation angles of a diffracting portion according to claim 8, wherein the reference photodetector and measuring photodetector are realized by one common unit.

11. The apparatus for detecting rotation angles of a diffracting portion according to claim 4, wherein the apparatus for detecting rotation angles of a diffracting portion is used in a tunable wavelength light source of external resonance type for reflecting the light between the diffracting portion and the light source, and issuing the resonating tunable wavelength light, and said signal processor includes a feeding unit which feeds correction data from the data correcting means to the drive unit in order to correct the rotation angle of the predetermined optical element of the diffracting portion prior to outputting the tunable wavelength light from the tunable wavelength light source of external resonance type.

12. The apparatus for detecting rotation angles of a diffracting portion according to claim 11, further comprising a changing unit which changes over between the reference wavelength light source and the main light source.

13. A method of detecting rotation angles of a diffracting portion comprising:

emitting reference light from a reference wavelength light source, wherein the reference wavelength light source includes a light source which emits wide-band reference light, and an absorption cell which receives the wide-band reference light and in which a plurality of kinds of gases are sealed, wherein each of the gases has wavelength regions in which absorption lines exist, the wavelength regions being different from each other, and wherein the reference light has specific wavelengths depending on the absorption cell;

diffracting the reference light emitted from said reference wavelength light source by a diffracting portion, wherein the diffracting portion comprises optical elements including a predetermined optical element;

rotating said predetermined optical element of the diffracting portion by a drive unit;

detecting a rotation angle of the predetermined optical element by an angle detector;

receiving diffracted light emitted in a predetermined direction from the diffracting portion receiving the reference light from the reference wavelength light source, and converting the diffracted light into an electric signal by a reference photodetector; and receiving the rotation angle detected by said angle detector when detecting a predetermined value including a minimum value of the electric signal produced by said reference photodetector according to the rotation angle of the predetermined optical element rotated by the drive unit, and determining specific rotation angles corresponding to the specific wavelengths of the reference light by a signal processor, wherein the signal processor (a) causes the diffracting portion to rotate to a maximum rotatable angle from a reference position via the drive unit, and while rotating the diffracting portion to the maximum rotatable angle, associates data of rotation angles from the angle detector with data of electric signals from the reference photodetector and stores the associated data of rotation angles and electric signals, (b) obtains from the stored data the specific rotation angles corresponding to the specific wavelengths of the reference light when intensity of the received light within each of the wavelength regions corresponding to the gases in the absorption cell is at a minimum, depending on the gases sealed in the absorption cell, and (c) obtains rotation angles lying between the specific rotation angles corresponding to the specific wavelengths using the stored data by interpolation including linear interpolation.

14. The method of detecting rotation angles of a diffracting portion according to claim 13, wherein the plurality of different gases sealed in the absorption cell include at least two gases selected from carbon dioxide ($CO_2$) of which absorption line wavelengths are concentrated around 1.43 $\mu$m, acetylene gas ($C_2H_2$) of which absorption line wavelengths are concentrated around 1.53 $\mu$m, and methane gas ($CH_4$) of which absorption line wavelengths are concentrated around 1.65 $\mu$m.

15. The method of detecting rotation angles of a diffracting portion according to claim 13, wherein:

the plurality of different gases sealed in the absorption cell include a first gas whose absorption line wavelengths are concentrated around 1.53 $\mu$m and a second gas whose absorption line wavelengths are concentrated around 1.65 $\mu$m, and said signal processor determines first and second specific rotation angles corresponding to first and second specific wavelengths determined depending on the first and second gases sealed in the absorption cell, and determines the rotation angles between plural specific rotation angles by predetermined complementary calculation including linear complement, so as to cover the wavelength region of the light in part of S band (1.46 $\mu$m to 1.53 $\mu$m) and C band (1.53 $\mu$m to 1.565 $\mu$m) on the basis of the specific wavelength determined depending on the first gas, and L band (1.565 $\mu$m to 1.625 $\mu$m) on the basis of the specific wavelength determined depending on the second gas.

16. The method of detecting rotation angles of a diffracting portion according to claim 13, wherein the light emitted from the absorption cell in the reference wavelength light source has a plurality of absorption lines in each wavelength region, and said signal processor calculates the rotation angle determining whether or not the light received by the reference photodetector corresponds to the absorption line of which wavelength from the level change of the diffracted light issued from the diffracting portion, by making use of the characteristic that the plural absorption lines of each wavelength region have mutually different absorption rates in each absorption line.

17. The method of detecting rotation angles of a diffracting portion according to claim 13, further comprising:

receiving a set wavelength value and issuing to the drive unit angle data to drive so that the predetermined optical element of the diffracting portion may be set at a rotation angle corresponding to the wavelength value, by a rotation angle setting unit having angle-wavelength data; and correcting the angle-wavelength data possessed in the rotation angle setting unit based on the plural specific rotation angles corresponding to the plural specific wavelengths in each wavelength region, by a data correcting unit.

18. The method of detecting rotation angles of a diffracting portion according to claim 17, further comprising:

feeding correction data from the data correcting means to the drive unit in order to correct the angle of the predetermined optical element of the diffracting portion prior to spectrum analysis of the light to be measured, being applied in analysis of spectrum of the light to be measured.

19. The method of detecting rotation angles of a diffracting portion according to claim 18, further comprising:

receiving the diffracted light of the light to be measured while the predetermined optical element of the diffracting portion is rotating according to the set wavelength value, and converting the diffracted light into an electric signal, by a measuring photodetector; and issuing the electric signal issued from the measuring photodetector by relating to the set wavelength value, by a spectrum processor.

20. The method of detecting rotation angles of a diffracting portion according to claim 18, further comprising:

receiving the diffracted light of the light to be measured while the predetermined optical element of the diffracting portion is rotating according to the set wavelength value, and converting the diffracted light into an electric signal, by a measuring photodetector; and determining an electric signal at the set wavelength value based on the angle-wavelength data corrected by the data correcting means, from the electric signal issued by the measuring photodetector, and issuing by relating the set wavelength value with the electric signal, by a spectrum processor.

21. The method of detecting rotation angles of a diffracting portion according to claim 19, further comprising:

changing over between the light from the reference wavelength light source and the light to be measured.

22. The method of detecting rotation angles of a diffracting portion according to claim 19, further comprising realizing the reference photodetector and measuring photodetector by one common unit.

23. The method of detecting rotation angles of a diffracting portion according to claim 17, further comprising:

being used in a tunable wavelength light source of external resonance type which reflects the light between the diffracting portion and the light source, and issues the resonating variable wavelength light;

feeding correction data from the data correcting means to the drive unit in order to correct the rotation angle of the predetermined optical element of the diffracting portion prior to output the tunable wavelength light from the tunable wavelength light source of external resonance type.

24. The method of detecting rotation angles of a diffracting portion according to claim 23, further comprising:

changing over between the reference wavelength light source and the main light source.

* * * * *